3,467,710
β-(4- OR 5-PHENYL-1-NAPHTHALENE) ETHYLAMINES
James S. Kaltenbronn, Ann Arbor, Mich., assignor to Parke, Davis & Company, Detroit, Mich., a corporation of Michigan
No Drawing. Continuation-in-part of application Ser. No. 569,806, Aug. 3, 1966. This application May 27, 1968, Ser. No. 732,067
Int. Cl. C07c 87/28; A61k 27/00
U.S. Cl. 260—570.8   6 Claims

ABSTRACT OF THE DISCLOSURE

β-(4- or 5-phenyl-1-naphthalene)ethylamines, optionally substituted at β-position or on the amino group by lower alkyl, and acid-addition salts thereof. The compounds of the invention are useful as anti-inflammatory agents.

CROSS-REFERENCE TO RELATED APPLICATIONS

This application is a continuation-in-part of application Ser. No. 569,806 filed Aug. 3, 1966, now abandoned, which application is a continuation-in-part of application Ser. No. 477,953 filed Aug. 6, 1965, now abandoned.

SUMMARY AND DETAILED DESCRIPTION

The present invention relates to new amine compounds and to methods for their production. More particularly, the invention relates to new β-(1-naphthalene)ethylamine compounds having the formula

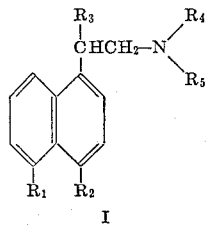

I and to pharmaceutically-acceptable acid-addition salts thereof; where one of $R_1$ and $R_2$ is hydrogen, and the other of $R_1$ and $R_2$ is phenyl; $R_3$ is hydrogen or lower alkyl; and each of $R_4$ and $R_5$ is hydrogen or lower alkyl. The lower alkyl groups represented by $R_3$, $R_4$, and $R_5$ are those containing not more than four carbon atoms and are preferably methyl or ethyl.

In accordance with the invention β-(1-naphthalene)ethylamine compounds having the formula

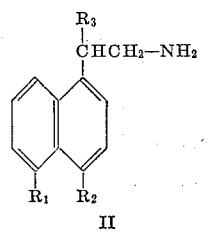

II are produced by reducing a compound having the formula

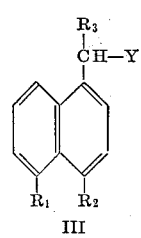

III where $R_1$, $R_2$, and $R_3$ are as previously defined and Y is a group reducible to a primary aminomethyl group (—$CH_2NH_2$). The preferred groups reducible to an aminomethyl group are cyano and carbamyl, because compounds containing these groups are quite readily available and are reducible to the amine compounds in high yields.

The reduction may be accomplished by employing catalytic, chemical, or electrolytic means. The reduction is accomplished catalytically by employing gaseous hydrogen and a hydrogenation catalyst in an unreactive solvent. Catalysts that may be used include Raney cobalt, Raney nickel, and the noble metal catalysts, platinum, platinum oxide, palladium, and palladium oxide, which may optionally be supported on an inert carrier, such as charcoal. The catalytic reduction employing Raney cobalt or Raney nickel is carried out in the presence of a small amount of ammonia or tertiary amine, such as triethylamine, in order to supress formation of any secondary amine product. When one of the noble metal catalysts is employed, the reduction is best accomplished in the presence of an alkali metal acetate and acetic anhydride. In such a case, the initial product is an N-acetylated amine compound, which is subsequently hydrolyzed to give the desired free amine product. Suitable unreactive solvents that may be used include aromatic hydrocarbons, such as benzene and toluene; ethers, such as dioxane and 1,2-dimethoxyethane; and tertiary amines, such as N,N-dimethylformamide; as well as mixtures of these. The temperature of the catalytic reduction reaction is not critical and may be varied from room temperature to about 150° C. A temperature in the range, 100–150° C., is preferred, however, for rapid reduction. The reduction is best accomplished by employing hydrogen at a pressure of 1000 to 2500 lbs./in.², although pressures somewhat outside this range may also be employed. The duration of the reaction will vary, depending on the catalyst, temperature and hydrogen pressure employed. Normally the reaction is allowed to proceed until the required amount (2 molecular equivalents) of hydrogen has been absorbed. For the catalytic reduction of compounds wherein Y is cyano, the preferred catalyst is Raney cobalt.

Chemical reducing agents that may be employed are the complex metal hydrides, such as lithium aluminum hydride, lithium aluminum hydride-aluminum chloride, sodium borohydride-aluminum chloride, sodium trimethoxyborohydride, and aluminum hydride-aluminum chloride. The reduction employing one of these complex metal hydrides is carried out in an anhydrous, unreactive, non-hydroxylic organic solvent. Preferred solvents are the ethers, diethyl ether, terahydrofuran, 1,2-dimethoxyethane, and diethylene glycol dimethyl ether. The chemical reduction is best carried out at the reflux temperature of the reaction mixture for a period that may vary from about 2 hours to 18 hours and longer. While equivalent quantities of reactants may be used, it is preferable to employ the reducing agent in moderate excess. Following initial reaction with the complex metal hydride, the reaction mixture is hydrolyzed with an aqueous medium such as water, dilute aqueous inorganic acids or bases and other media containing water. While in ordinary practice a considerable excess of the aqueous medium is added, at least four moles of water should be present for each mole of lithium aluminum hydride to insure complete hydrolysis. Reduction by means of a complex metal hydride, preferably lithium aluminum hydride, is the preferred method for the reduction of compounds wherein Y is a carbamyl group.

Starting materials required for use in the foregoing reduction process can be prepared by a variety of methods, as illustrated in greater detail hereinafter. For example, 4-phenyl,-1-naphthylacetonitrile is prepared by reacting 1-phenylnaphthalene with paraformaldehyde and hydrochloric acid to produce 4-phenyl-1-chloromethylnaphthalene, which is then reacted with sodium cyanide in aqueous medium to produce the desired 4-phenyl-1-naphthylacetonitrile. 5-Phenyl-1-naphthylacetonitrile can be prepared by reacting 5-phenyl-1-methylnaphthalene with N-bromosuccinimide to produce 5-phenyl-1-bromoethylnaphthalene, which is converted by reaction with sodium cyanide in an aqueous medium to 5-phenyl-1-naphthylacetonitrile. The α-alkyl-4- and 5-phenyl-1-naphthylacetonitrile compounds are prepared by reacting the sodium salts of 4- and 5-phenyl-1-naphthylacetonitriles with an appropriate alkyl iodide. The 4- and 5-phenyl-1-naphthylacetamide compounds are prepared by the alkaline hydrolysis of the corresponding 4- and 5-phenyl-1-naphthylacetonitrile compounds in the presence of hydrogen peroxide.

Also in accordance with the invention, β-(1-naphthalene)ethylamine compounds having the formula

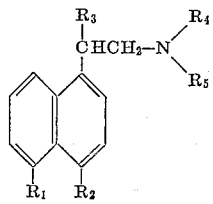

IV are produced by reducing an amide compound having the formula

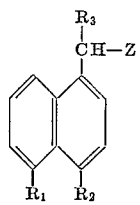

V where $R_1$, $R_2$, $R_3$, $R_4$, and $R_5$ all have the aforementioned significance, and Z represents a group having the formula

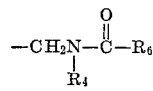

or a group having the formula

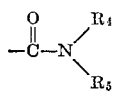

where $R_6$ is hydrogen or a lower alkyl radical having not more than three carbon atoms. The reduction may be carried out employing catalytic, chemical, or electrolytic means.

The reduction is accomplished catalytically by employing gaseous hydrogen and hydrogenation catalyst, optionally in an unreactive solvent medium. Suitable catalysts for this purpose include Raney nickel, Raney cobalt, and copper chromite. The reduction is best carried out in the presence of ammonia or a tertiary amine, such as triethylamine. Although a solvent is not strictly required, suitable solvents that may be used, if desired, include various ethers, such as dioxane and 1,2-dimethoxyethane, and various hydrocarbons, such as isooctant and decalin. For rapid and complete reduction, a temperature in the range, 200–350° C., is preferred. Temperatures somewhat outside this range may also be employed, however. The reduction is best accomplished by using hydrogen at a pressure of 250 to 400 atmospheres (about 3500 to 6000 lbs./in.²), although pressures somewhat outside this range may also be employed. The duration of the reaction will vary, depending on the catalyst, temperature, and hydrogen pressure employed. Normally, the reaction is allowed to proceed until the required amount (2 molecular equivalents) of hydrogen has been absorbed.

The reduction may be accomplished chemically by employing various complex metal hydrides, such as lithium aluminum hydride, lithium aluminum hydride-aluminum chloride, sodium borohydride-aluminum chloride, and aluminum hydride-aluminum chloride, and diborane in an anhydrous unreactive, non-hydroxylic solvent medium, which is preferably an ether, such as diethyl ether, dioxane, terahydrofuran, 1,2-dimethoxyethane, and diethylene glycol dimethyl ether. For reduction of the primary and secondary amides of Formula V, the preferred reducing agent is lithium aluminum hydride-aluminum chloride; for reduction of the tertiary amides, the preferred agent is lithium aluminum hydride. The sodium borohydride-aluminum chloride agent gives satisfactory results only when used for the reduction of the tertiary amides. The temperature and duration of the chemical reduction reaction are not critical and will vary, depending on the solvent and reducing agent employed. In the usual case, the reaction is best carried out at the reflux temperature of the reaction mixture for a period that may vary from about one hour to 24 hours and longer. While equivalent quantities of reactants may be used, it is preferable to employ the reducing agent in moderate excess. Following initial reaction with the reducing agent, the reaction mixture is hydrolyzed with an aqueous medium, which may be water, dilute aqueous inorganic acids or bases or other media containing water. A considerable excess of the aqueous medium is employed to insure that hydrolysis is complete.

The amide compounds of Formula V that are used as starting materials in the foregoing process can be prepared according to various methods as illustrated in greater detail hereinafter. For example, N-[2-(4-phenyl-1-naphthyl)ethyl]acetamide is prepared by reacting β-(4-phenyl-1-naphthalene)ethylamine with acetyl chloride in the presence of pyridine. N,N-dimethyl-5-phenyl-1-naphthylacetamide is prepared by first reacting 5-phenyl-1-naphthaleneacetic acid with thionyl chloride to obtain 5-phenyl-1-naphthaleneacetyl chloride, and then reacting this acid chloride with dimethyl amine. The 5-phenyl-1-naphthaleneacetic acid used in this procedure is prepared by hydrolyzing 5-phenyl-1-naphthylacetonitrile.

Further in accordance with the invention, β-(1-naphthalene)ethylamine compounds having the formula

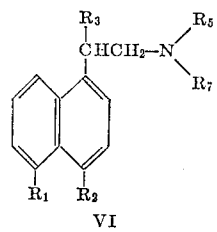

VI are produced by reacting an amine compound having the formula

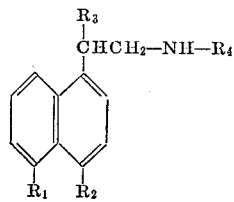

VII with an alkylating agent; where $R_1$, $R_2$, $R_3$, $R_4$, and $R_5$ all have the same meaning as previously given, and $R_7$ is lower alkyl. Suitable alkylating agents for use in this reaction are lower alkyl halides, such as methyl iodide and ethyl bromide; lower alkyl esters of inorganic acids and organic sulfonic acids, such as dimethyl sulfate, diethyl sulfate, methyl benzenesulfonate, and methyl p-toluenesulfonate; and trialkyloxonium fluoborates, such as triethyloxonium fluoborate. The reaction is preferably carried out in the presence of a base; suitable bases for this purpose are alkali metal carbonates and alkali metal bicarbonates. The ratio of reactants will depend on the starting material that is employed and the product that is desired. When the starting material is a primary amine (Formula VII, $R_4$=H), a secondary amine product (Formula VI, $R_5$=H) is obtained by using slightly more than one equivalent of alkylating agent and base, whereas a tertiary amine product (Formula VI, $R_5$=$R_7$=lower alkyl) is obtained by using somewhat more than two equivalents of alkylating agent and base. When the starting material is a secondary amine (Formula VII, $R_4$=loweralkyl), a tertiary amine product (Formula VI, each of $R_5$ and $R_7$=lower alkyl) is obtained by using slightly more than one equivalent of alkylating agent and base. Depending upon the particular alkylating agent and base chosen, a variety of solvents and reaction conditions may be used. Some examples of suitable solvents are aromatic hydrocarbons, ethers, lower alkanols, lower aliphatic ketones, and other non-reactive solvents, such as dimethyl sulfoxide, N,N-dimethylformamide, and acetonitrile. With dimethyl sulfate or diethyl sulfate as the alkylating agent, water or an aqueous lower alkanol may advantageously be employed as solvents. The temperature and duration of the reaction are not critical and may be varied over a wide range, depending upon the particular alkylating agent and solvent that are used. It is most convenient to carry out the reaction at the reflux temperature of the reaction mixture for a period that may vary from 30 minutes to several days.

For the preparation of amine compounds of Formula VI wherein one or both of $R_5$ and $R_7$ is methyl, an alternative method to the one described above comprises reacting an amine compound of Formula VII with an aqueous mixture of formaldehyde and formic acid. Both the formaldehyde and formic acid are used in substantial excess, with the excess formic acid serving as solvent for the reaction. Additional solvent is neither required nor desirable. The temperature of the reaction may be varied between about 70° C. and 125° C., with a temperature in the range, 90–110° C. being preferred. The duration of the reaction is not critical and may be varied from about 3 to about 16 hours. At the preferred temperature, the reaction is usually complete in about 4 to 8 hours.

The free base compounds of the invention form acid-addition salts with a variety of inorganic and organic acids. Pharmaceutically-acceptable salts are formed by the reaction of the free base with an acid such as hydrochloric, hydrobromic, hydriodic, sulfuric, acetic, benzoic, citric, tartaric, maleic, and related acids. The salt formation is suitably carried out by reacting the selected base with the selected acid in an unreactive solvent. The acid-addition salts can be converted to the free bases by reaction with a base such as sodium carbonate or potassium carbonate. In the applications of this invention, the compounds are preferably employed in the form of acid-addition salts.

The compounds of the invention are new chemical compounds that are useful as pharmacological agents, especially as anti-inflammatory agents. As such, they are of value in mitigating the symptoms associated with inflammatory conditions, as well as in preventing or suppressing the occurrence of inflammation. Their anti-inflammatory activity is demonstrable and quantitatively measurable in a test designed to measure the ability of a test compound to delay the normal appearance of an erythema in animals exposed to ultraviolet radiation under standardized conditions. The test procedure that is used has been described in Archives Internationales de Pharmacodynamie et de Therapie, vol. 116, pages 261–292, 1958. This test has been found to be a reliable indicator of anti-inflammatory activity, as demonstrated, for example, for the known clinically useful agents, aminopyrine, antipyrine, and aspirin.

The results obtained for some representative compounds of the present invention, when tested by the standard test procedure, are shown in the following table. In the table, anti-inflammatory activity is given in terms of the minimum dose that was found to be effective in delaying the appearance of an erythema.

| Compound: | Minimum effective dose, mg./kg. |
|---|---|
| β-(4-phenyl-1-naphthalene)ethylamine hydrochloride | 0.8 |
| β-(5-phenyl-1-naphthalene)ethylamine hydrochloride | 0.1 |
| β-(5-phenyl-1-naphthalene)-n-propylamine hydrochloride | 6.2 |
| N-ethyl-β-(4-phenyl-1-naphthalene)-ethylamine hydrochloride | 6.2 |
| N,N-dimethyl-β-(5-phenyl-1-naphthalene)-ethylamine hydrochloride | 0.4 |

The compounds of the invention are preferably administered by the oral route although parenteral administration can also be used. They can be combined with either a solid or liquid carrier or diluent and made available in varying amounts in such pharmaceutical forms as tablets, capsules, powders and aqueous and non-aqueous suspensions and solutions.

The invention is illustrated by the following examples.

Example 1

A mixture consisting of 30.0 g. of 4-phenyl-1-naphthylacetonitrile, 8 g. of Raney cobalt, 8 ml. of triethylamine, and 150 ml. of toluene is shaken at 100° C. with hydrogen at a pressure of 1750 lbs./in.$^2$ until 2 molar equivalents of hydrogen are taken up. The catalyst is removed by filtration, the filtrate is evaporated to dryness under reduced pressure, and the residue is dissolved in ether. The ethereal solution is treated with excess dry hydrogen chloride, and the β-(4-phenyl-1-naphthalene) ethylamine hydrochloride that precipitates is isolated, dried, and crystallized twice from methanol-ethyl acetate; M.P. 286–288° C.

The free base, β-(4-phenyl-1-naphthalene)-ethylamine, is obtained by suspending 5.0 g. of the hydrochloride salt in 50 ml. of water, adding to the solution a slight excess of 10% aqeous sodium hydroxide, extracting the alkaline mixture with ether, drying the ether solution, and evaporating the solvent from the dried solution under reduced pressure. The free base is obtained as an oil that is difficult to crystallize.

A water-soluble citrate of β-(4-phenyl-1-naphthalene)ethylamine is obtained by mixing a solution of 4.9 g. of the free base in 30 ml. of methanol with a solution of 1.4 g. of citric acid monohydrate in 25 ml. of methanol, evaporating the resulting mixture to a volume of about 10–15 ml., and isolating the precipitated salt.

The 4-phenyl-1-naphthylacetonitrile used as starting material in the foregoing procedure can be prepared as follows. A mixture of 100 g. of 1-phenylnaphthalene, 27 g. of paraformaldehyde, 100 ml. of acetic acid, 112 ml. of concentrated hydrochloric acid and 54 ml. of phosphoric acid is heated with stirring for 12 hours at 88–91° C., an additional 30 ml. of concentrated hydrochloric acid being added in portions at intervals during the heating period. The mixture is allowed to stand at room temperature for 16 hours and poured into water. The water is removed by decantation and the residue is dissolved in chloroform. The chloroform solution is washed with water, with saturated sodium bicarbonate solution, and with several additional portions of water, dried, and evaporated under reduced pressure to give a residue of 4-phenyl-1-chloromethylnaphthalene, B.P. 141–160° C. at 0.25 mm., M.P. 62–64° C. following crystallization of the distillate from hexane. A solution of 25.2 g. of this product in 150 ml. of acetone and 100 ml. of ethanol is treated with 4.9 g. of sodium cyanide in 30 ml. of water and heated at reflux for 5 hours. The solvent is removed under reduced pressure and the residue is stirred with water and chloroform. The chloroform solution is separated, washed with water, dried and evaporated under reduced pressure to give 4- phenyl - 1 - naphthylacetonitrile; M.P. 102–103° C. following crystallization from benzene-hexane.

Example 2

A mixture consisting of 5.0 g. of 5 - phenyl - 1 - naphthylacetonitrile, 1.0 g. of Raney cobalt, 1.0 ml. of triethylamine, and 150 ml. of toluene is hydrogenated at 105° C. with hydrogen at a pressure of 2000 lbs./in.$^2$ The catalyst is removed from the cooled solution by filtration, the filtrate is evaporated to dryness under reduced pressure, and the residue is dissolved in either. The ethereal solution is treated with excess dry hydrogen chloride, and the β - (5 - phenyl - 1 - naphthalene) ethylamine hydrochloride that precipitates is isolated, dried, and crystallized twice from methanol-ethyl acetate; M.P. 297–301° C.

The free base, β - (5 - phenyl - 1 - naphthalene) ethylamine, is obtained by suspending 5.0 g. of the hydrochloride salt in 50 ml. of water, neutralizing the solution with dilute aqueous sodium hydroxide, extracting the neutral solution with ether, drying the ethereal solution, and evaporating the solvent from the dried solution under reduced pressure. The free base is obtained as an oil that is difficult to crystallize.

The hydrobromide salt of β - (5 - phenyl - 1-naphthalene) ethylamine is obtained by dissolving the free base in ether, treating the ethereal solution with a slight excess of dry hydrogen bromide, concentrating the resulting mixture, and isolating the precipitated salt.

The acetate salt is obtained by dissolving the free base in ether, adding to the solution a slight excess of glacial acetic acid, concentrating the resulting mixture, and isolating the precipitated salt.

The 5 - phenyl - 1 - naphthylacetonitrile used as starting material in the foregoing procedure is prepared as follows. A mixture prepared by adding 10.5 g. of recrystallized N - bromosuccinimide and 100 mg. of dibenzoyl peroxide to 12.6 g. of 5 - phenyl - 1-methylnaphthalene in 125 ml. of carbon tetrachloride is heated at reflux for 2 hours, with irradiation from a floodlight. The mixture is filtered and the filtrate is washed with 5% sodium hydroxide and with several portions of water, dried, and evaporated to give a residue of 5 - phenyl - 1-bromomethylnaphthalene. A solution of 15.9 g. of this product in 75 ml. of ethanol and 75 ml. of acetone is treated with 2.7 g. of sodium cyanide in 15 ml. of water. The resulting solution is heated at reflux for five hours, distilled to a small volume under reduced pressure and diluted with ether. The ether solution is washed with water, dried, and evaporated to give 5 - phenyl - 1-naphthylacetonitrile, suitable for use without further purification.

Example 3

A solution of 26.1 g. of 4 - phenyl - 1 - naphthylacetamide in 500 ml. of dry ether is added dropwise to a stirred suspension of 9.0 g. of lithium aluminum hydride in 500 ml. of ether, and the resulting mixture is heated under gentle reflux overnight. The mixture is cooled, treated with water to decompose excess lithium aluminum hydride, and the ethereal phase is isolated by decantation, washed with water, dried, and evaporated to dryness to give β - (4 - phenyl - 1 - naphthalene) ethylamine as an oil. The oil is dissolved in ether, the solution is treated with excess dry hydrogen chloride, and the β - (4 - phenyl - 1 - naphthalene)ethylamine hydrochloride that precipitates is isolated, dried, and crystallized twice from methanol-ethyl acetate; M.P. 286–288° C.

The 4-phenyl-1-naphthylacetamide used as starting material in the foregoing procedure is prepared as follows. To a mixture consisting of 24.3 g. of 4-phenyl-1-naphthylacetonitrile, 300 ml. of methanol, 150 ml. of acetone, and 35 ml. of 20% aqueous sodium hydroxide is carefully added 50 ml. of 30% hydrogen peroxide, and the resulting mixture is stirred at room temperature overnight. After evaporation of the solvent, the residue is dissolved in ether, and the ethereal solution is washed with water, with 5% aqueous sodium sulfite, and with water again. After drying, the dried solution is evaporated to dryness to give the desired 4-phenyl-1-naphthylacetamide, suitable for use without further purification.

Example 4

A mixture consisting of 4.0 g. of α-(5-phenyl-1-naphthyl)propionitrile, 1.0 g. of Raney cobalt, 1.0 ml. of triethylamine, and 60 ml. of toluene is shaken at 107° C. with hydrogen at a pressure of 2150 lbs./in.$^2$ until 2 molar equivalents of hydrogen are taken up. The catalyst is removed by filtration, the filtrate is evaporated to dryness under reduced pressure, and the residue is dissolved in ether. The ethereal solution is treated with excess dry hydrogen chloride, and the β-(5-phenyl-1-naphthalene)-n-propylamine hydrochloride that precipitates is isolated, dried, and crystallized several times from methanol-ethyl acetate; M.P. 303–304° C.

The α-(5-phenyl-1-naphthyl)propionitrile used as starting material in the foregoing procedure is prepared as follows. A solution of 9.0 g. of 5-phenyl-1-naphthylacetonitrile in 30 ml. of dimethylsulfoxide is added dropwise with stirring to a mixture consisting of 1.93 g. of a 53.4% dispersion of sodium hydride in mineral oil and 20 ml. of dimethylsulfoxide kept at a temperature between 15 and 25° C. in a nitrogen atmosphere. The mixture is stirred at room temperature for 5 hours more, and 10.5 g. of methyl iodide is then added dropwise with stirring and cooling to maintain the temperature below 25° C. After the mixture is stirred at room temperature for an additional 16 hours, it is treated with a solution of 9 ml. of acetic acid in 20 ml. of water, and the resulting mixture is extracted well with ether. The ethereal extract is washed with water, with saturated aqueous sodium bicarbonate, and with water again, then dried and evaporated under reduced pressure to give α-(5-phenyl-1-naphthyl)propionitrile; M.P. 91.5–93° C., following crystallization from benzenehexane.

Example 5

A suspension of 1.23 g. of aluminum chloride in 5 ml. of toluene is added to a suspension of 1.05 g. of lithium aluminum hydride in 80 ml. of dry ether, and the resulting mixture is stirred at room temperature for one hour. To this mixture is added a solution of 4.0 g. of N-[2-(4-phenyl-1-naphthyl)ethyl]acetamide in 100 ml. of tetrahydrofuran, the reaction mixture is stirred for 16 hours at room temperature, and then treated with dilute aqueous sodium hydroxide to decompose excess reducing agent. The organic phase is separated and the residual inorganic salts are washed twice with ether. The ether washings are combined with the separated organic phase, and the solution is dried and evaporated under reduced pressure to give N-ethyl-β-(4-phenyl-1-naphthalene)-ethylamine as an oil. The oily product is dissolved in ether, the solution is treated with excess dry hydrogen chloride, and the N-ethyl-β-(4-phenyl-1-naphthalene)-ethylamine hydrochloride that precipitates is isolated, dried, and crystallized from methanol-ethyl acetate; M.P. 216–218° C.

The starting material is prepared as follows. To a stirred mixture consisting of 2.0 g. of β-(4-phenyl-1-naphthalene)ethylamine, 20 ml. of pyridine, and 40 ml. of benzene is added dropwise 0.76 g. of acetyl chloride, and the resulting solution is heated at 60° C. for one hour. The cooled solution is poured into 100 ml. of water, and the organic phase is separated, washed with water, with 5% aqueous sodium carbonate, and with water again, dried and evaporated under reduced pressure to give N-[2-(4-phenyl - 1 - naphthyl)ethyl]acetamide; M.P. 121–122° C., following crystallization from benzenehexane.

Example 6

A solution of 14.45 g. of N,N-dimethyl-5-phenyl-1-naphthylacetamide in 200 ml. of tetrahydrofuran is added dropwise to a stirred suspension of 3.8 g. of lithium aluminum hydride in 100 ml. of ether and the resulting mixture is heated under gentle reflux for 4 hours. The mixture is cooled, 25 ml. of ethyl acetate and then 25 ml. of water are added, the organic phase is isolated by decantation, and the inorganic residue is washed twice with ether. The combined ether washings and organic phase are washed with water, dried, and evaporated under reduced pressure to give N,N-dimethyl-β-(5-phenyl-1-naphthalene)ethylamine as an oil. The oily free base product is dissolved in ether, the solution is treated with excess dry hydrogen chloride, and the N,N-dimethyl-β-(5-phenyl-1-naphthalene)ethylamine hydrochloride that precipitates is isolated, dried, and crystallized from ethyl acetate-methanol-hexane; M.P. 253–254° C.

The N,N-dimethyl-5-phenyl-1-naphthylacetamide used as starting material in the foregoing procedure is prepared as follows. A solution of 12.4 g. of potassium hydroxide in 40 ml. of water is added to a solution of 12.4 g. of 5-phenyl-1-naphthylacetonitrile in 125 ml. of ethanol, and the mixture is heated at reflux for 12 hours, concentrated to a small volume under reduced pressure, diluted with water, and washed twice with ether. The aqueous phase is acidified with dilute hydrochloric acid and the insoluble product which separate is extracted with ether. The ether extract is washed with water, dried, and evaporated to give a residue of 5-phenyl-1-naphthaleneacetic acid; M.P. 180–182° C., following several crystallizations from benzene-n hexane. This intermediate (26.2 g.) is added to a mixture consisting of 250 ml. of benzene, 250 ml. of thionyl chloride, and 1 ml. of pyridine, and the resulting solution is heated under reflux for 2 hours, and then evaporated to dryness under reduced pressure to give 5-phenyl-1-naphthylacetyl chloride, suitable for use without further purification. A mixture consisting of 28.0 g. of 5-phenyl-1-naphthylacetyl chloride, 9.0 g. of dimethyl amine and 300 ml. of benzene is heated at 60° C. in a sealed pressure vessel for one hour, and then evaporated to dryness under reduced pressure. The residue is extracted into ethyl acetate, and the resulting solution is washed with water, dried, and evaporated to give a residue of N,N-dimethyl-5-phenyl-1-naphthylacetamide that is suitable for use without further purification.

Example 7

A mixture consisting of 24.7 g. of β-(5-phenyl-1-naphthalene)ethyl amine, 31.2 g. of methyl iodide, 40 g. of potassium carbonate, and 150 ml. acetonitrile is heated under reflux for 5 hours. After cooling, the mixture is diluted with 500 ml. of water, and the aqueous mixture is extracted with ether. The ether extract is washed well with water, dried, and evaporated under reduced pressure to give N,N-dimethyl-β-(5-phenyl-1-naphthalene)ethylamine as an oil. The oily free base product is dissolved in ether, the solution is treated with excess dry hydrogen chloride, and the N,N-dimethyl-β-(5-phenyl-1-naphthalene)ethylamine hydrochloride that precipitates is isolated, dried, and crystallized from ethyl acetate-methanol-n-hexane; M.P. 253–263° C.

By utilizing the foregoing procedure, the following β-(1-naphthalene)ethylamine compounds are obtained from the reaction of the designated starting materials:

(a) From the reaction of 24.7 g. of β-(4-phenyl-1-naphthalene)ethylamine and 31.2 g. of methyl iodide there is obtained N,N-dimethyl-β-(4-phenyl-1-naphthalene)ethylamine (hydrochloride salt prepared as described above).

(b) From the reaction of 24.7 g. of β-(4-phenyl-1-naphthalene)ethylamine and 34.3 g. of ethyl iodide there is obtained N,N-diethyl-β-(4-phenyl-1-naphthalene)ethylamine (hydrochloride salt also prepared as described above).

Example 8

A mixture consisting of 5.0 g. of N-ethyl-β-(4-phenyl-1-naphthalene)ethylamine, 25 ml. of formic acid, and 7 ml. of 40% aqueous formaldehyde is heated at 95° C. for 6 hours. The cooled mixture is poured into 100 ml. of water, the aqueous mixture is made alkaline with aqueous sodium carbonate, and the alkaline mixture is extracted with ether. The ether extract is washed with water, dried, and evaporated to give a residue of N-ethyl-N-methyl-β-(4-phenyl-1-naphthalene)ethylamine. The free base product is dissolved in ether, the etheral solution is treated with excess dry hydrogen chloride, and the N-ethyl-N-methyl-β-(4-phenyl-1-naphthalene)ethylamine hydrochloride that precipitates is isolated and dried.

I claim:

1. A member of the class consisting of β-(1-naphthalene)ethylamine compounds having the formula

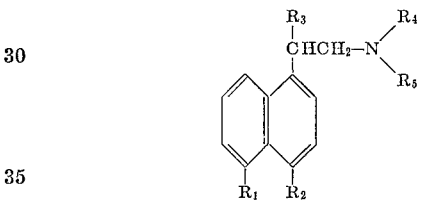

and pharmaceutically-acceptable acid-addition salts thereof; where one of $R_1$ and $R_2$ is hydrogen and the other of $R_1$ and $R_2$ is phenyl; $R_3$ is a member of the class consisting of hydrogen and lower alkyl; and each of $R_4$ and $R_5$ is a member of the class consisting of hydrogen and lower alkyl.

2. A compound according to claim 1 which is β-(4-phenyl-1-naphthalene)ethylamine hydrochloride.

3. A compound according to claim 1 which is β-(5-phenyl-1-naphthalene)ethylamine hydrochloride.

4. A compound according to claim 1 which is N,N-dimethyl-β-(5-phenyl-1-naphthalene)ethylamine hydrochloride.

5. A compound according to claim 1 which is N-ethyl-β-(4-phenyl-1-naphthalene)ethylamine hydrochloride.

6. A compound according to claim 1 which is β-(5-phenyl-1-naphthalene)-n-propylamine hydrochloride.

References Cited

UNITED STATES PATENTS 2,884,456    4/1959    Campbell _____ 260—570.8

OTHER REFERENCES

Morrison et al.: "Jour. Chem. Society London," 1950 pp. 1510–13.

ROBERT V. HINES, Primary Examiner

U.S. Cl. X.R.

204—163; 260—465, 501.1, 515, 544, 558, 562, 610, 649; 424—330